(12) United States Patent
Herault

(10) Patent No.: US 7,063,387 B2
(45) Date of Patent: Jun. 20, 2006

(54) SEAT FOR A TRANSPORT VEHICLE OR CRAFT, IN PARTICULAR AN AIRCRAFT

(75) Inventor: Patrick Herault, Saint Hilaire en Lignieres (FR)

(73) Assignee: Societe Industrielle et Commerciale de Material Aeronautique (FR)

( * ) Notice: Subject to any disclaimer, the term of this patent is extended or adjusted under 35 U.S.C. 154(b) by 0 days.

(21) Appl. No.: 10/832,369

(22) Filed: Apr. 27, 2004

(65) Prior Publication Data

US 2004/0217642 A1 Nov. 4, 2004

(30) Foreign Application Priority Data

Apr. 29, 2003 (FR) .................................. 03 05247

(51) Int. Cl.
*B60N 3/02* (2006.01)
(52) U.S. Cl. ............................. 297/411.32; 297/411.33; 297/411.38; 297/115; 297/117
(58) Field of Classification Search ........... 297/411.33, 297/411.32, 411.38, 117, 115
See application file for complete search history.

(56) References Cited

U.S. PATENT DOCUMENTS

| 3,880,466 A | | 4/1975 | Brennan | |
|---|---|---|---|---|
| 4,097,088 A | * | 6/1978 | Meiller ................... | 297/411.38 |
| 4,176,878 A | * | 12/1979 | Koutsky ...................... | 297/115 |
| 4,244,623 A | * | 1/1981 | Hall et al. ............. | 297/411.36 |
| 4,307,913 A | * | 12/1981 | Spiegelhoff ............ | 297/411.33 |
| 4,621,864 A | * | 11/1986 | Hill ............................ | 297/115 |
| 4,657,305 A | * | 4/1987 | Meiller ................... | 297/411.36 |
| 5,433,509 A | * | 7/1995 | Hotary et al. .......... | 297/411.33 |
| 5,547,257 A | | 8/1996 | Lavender | |
| 5,823,624 A | * | 10/1998 | Dahlbacka ............. | 297/411.36 |
| 6,776,455 B1 | * | 8/2004 | Longtin et al. .......... | 297/217.3 |

FOREIGN PATENT DOCUMENTS

EP 0 217 319 A2 9/1986

* cited by examiner

*Primary Examiner*—Peter M. Cuomo
*Assistant Examiner*—Erika Garrett
(74) *Attorney, Agent, or Firm*—Blank Rome LLP

(57) ABSTRACT

The invention relates to a seat for a transport vehicle or craft, the seat including a support structure (1) and at least one armrest (2) comprising a rest element (4) mounted on one end of a strut whose other end is hinged to the support structure about a first pivot (7) to tilt between an in-use position in which the rest element is substantially horizontal and a forwardly-tilted retracted position in which the rest element is substantially vertical and in front of the seat. The strut is L-shaped with a first arm (5) hinged at its free end about the first pivot and extending substantially rearwards from the first pivot when the strut is in the in-use position, and a second arm (6) extending substantially upwards when the strut is in the in-use position, and the rest element is hinged to the free end of the second arm of the strut about a second transverse axis (9).

13 Claims, 5 Drawing Sheets

SEAT FOR A TRANSPORT VEHICLE OR CRAFT, IN PARTICULAR AN AIRCRAFT

RELATED APPLICATION

This application claims priority to French patent application no. 0305247 filed on Apr. 23, 2005, the subject matter of which is herein incorporated by reference.

FIELD OF THE INVENTION

The present invention relates to a seat for a transport vehicle or craft, in particular an aircraft, and more particularly to such a seat including a support structure and at least one armrest comprising a rest element mounted on one end of a strut whose other end is hinged to the support structure about a first transverse axis or pivot to tilt between an in-use position in which the rest element is substantially horizontal and a forwardly-tilted retracted position in which the rest element is substantially vertical and in front of the seat.

BACKGROUND OF THE INVENTION

French Patent No. FR-A-2 233 821 discloses a seat with the rest element of the armrest mounted rigidly on the free end of the strut. As a result, even in its retracted position, the armrest takes up a considerable amount of space, in particular the rear portion of the rest element which, in that position, projects forwards and upwards from the front edge of the seat proper.

SUMMARY OF THE INVENTION

An object of the present invention is to mitigate that drawback.

More particularly, an object of the invention is to make the armrest more compact, in particular when it is in its retracted position.

Another object of the invention is to provide locking means that are particularly suitable for an armrest of an aircraft cabin seat that can be transformed from an "economy-class" version to a "business-class" version.

To this end, the invention provides a seat for a transport vehicle or craft, in particular an aircraft, the seat including a support structure and at least one armrest comprising a rest element mounted on one end of a strut whose other end is hinged to the support structure about a first transverse axis or pivot to tilt between an in-use position in which the rest element is substantially horizontal and a forwardly-tilted retracted position in which the rest element is substantially vertical and in front of the seat, wherein said strut is L-shaped with a first arm hinged at its free end about said first pivot and extending substantially rearwards from the first pivot when the strut is in the in-use position, and substantially forwards from the first pivot when the strut is in its retracted position and a second arm extending substantially upwards when the strut is in its in-use position, and substantially downwards when the strut is in the retracted position, and wherein the rest element is hinged to the free end of the second arm of the strut about a second transverse axis or pivot.

The term "transverse" is used to mean substantially perpendicular to the plane of symmetry of the seat. The term "forwards" is used to mean the direction in which an occupant of the seat looks, and the term "rearwards" is used to mean the opposite direction.

The particular shape of the arm and the fact that the rest element is hinged 10 to the arm make it possible to improve significantly the compactness of the armrest in the retracted position.

In a particular embodiment, the rest element is provided with a recess behind the second pivot, which recess is suitable for receiving the second arm when the strut is in its retracted position. By enabling that portion of the strut which is connected to the rest element to be received inside the rest element, such a configuration makes it possible to reduce the extent to which the armrest projects forwards when it is in the retracted position.

Also in a particular embodiment of the invention, first locking means are provided for locking the armrest at least when the strut is in the in-use position. More particularly, the first locking means may comprise means for locking the rear portion of the rest element to the support structure. The locking means for locking the rear portion of the rest element to the support structure may comprise a transverse finger mounted on the rear end of the rest element that cooperates with hook-shaped notch of a first lever hinged to the support structure about a third transverse axis or pivot.

It is also possible to provide an unlocking button mounted to move on the support structure so as to move the first lever.

Also in a particular embodiment of the invention, second locking means are provided for locking the armrest at least when the strut is in the retracted position. More particularly, the second locking means may comprise means for locking the rest element to the strut.

Said securing means may comprise a recess for receiving the front end of said rest element, which recess is integral with said support structure.

Said second locking means may comprise a second lever hinged to said first arm of said strut about a fourth transverse axis and provided at its free end with a setback organized to co-operate with said transverse finger.

The strut may be provided with passageways for at least one cable which may be an electrical cable or a mechanical control cable.

An abutment may be provided for acting when the rest element is in the in-use position to prevent the rest element from pivoting about the second transverse axis in the direction in which the armrest is put into the in-use position. The abutment may be adjustable.

BRIEF DESCRIPTION OF THE DRAWINGS

A particular embodiment of the invention is described below by way of non-limiting example and with reference to the accompanying drawings, in which.

DETAILED DESCRIPTION OF THE PRESENT INVENTION

Figure 1:
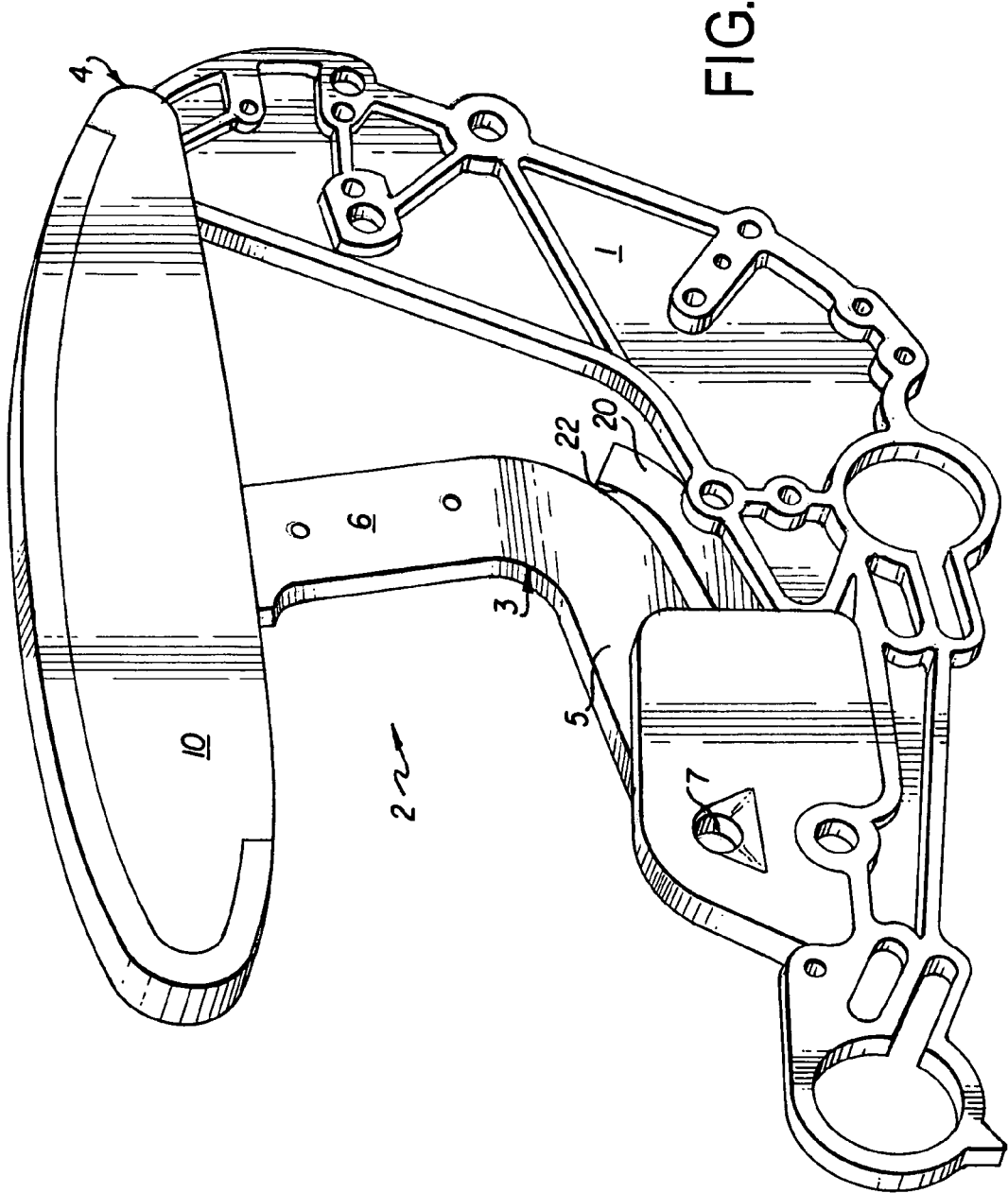
FIG. 1 is a side perspective view of an armrest of the invention in the in-use position.

The figures show a support structure element 1 for an aircraft seat. In a known manner, the structure element 1 supports the seat proper and the seat back.

An armrest 2 mounted on the structure element 1 is essentially made up of a strut 3 and of a rest element 4. The strut 3 is substantially L-shaped and it is made up of first and second arms 5 and 6 integral with each other (FIG. 4).

The strut 3 is hinged to the structure element 1 about a transverse axis or pivot 7 via that end of the arm 5 which is remote from the arm 6. When the armrest 2 is in its in-use position (shown in FIGS. 1 and 4), the arm 5 is substantially horizontal and extends rearwards from the pivot 7. In this position, the arm 6 extends substantially vertically upwards.

Figure 2:
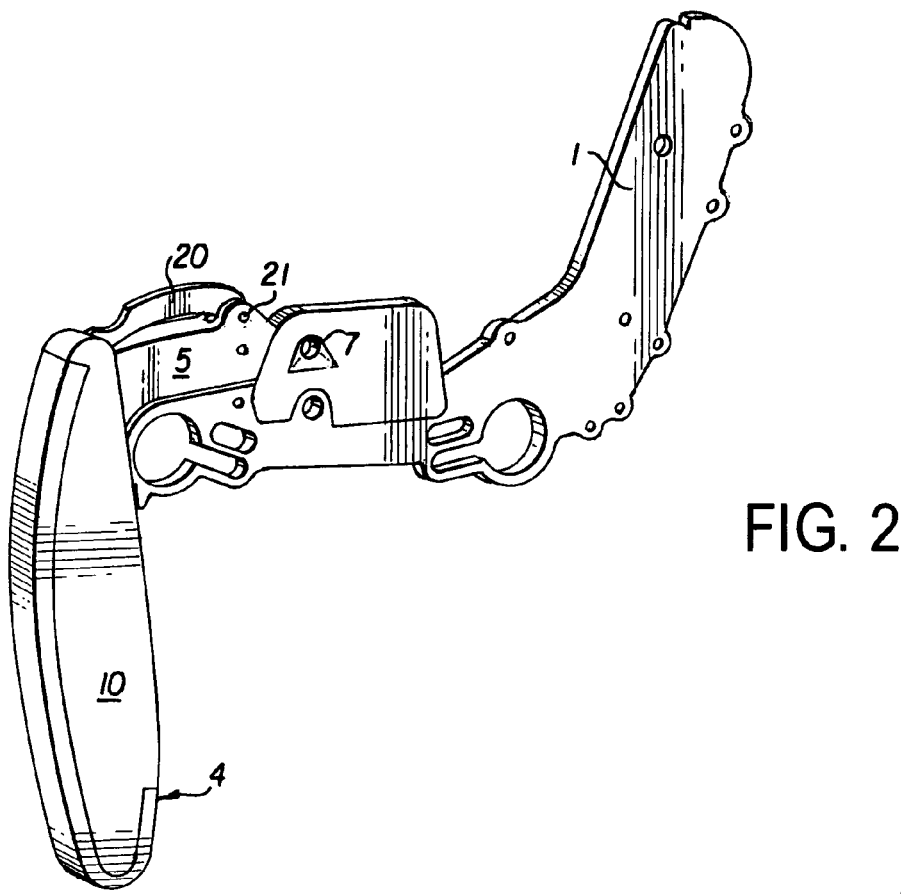
FIG. 2 is a side view similar to the FIG. 1 view, with the armrest locked in the retracted position.

When the armrest 2 is tilted forwards about the pivot 7 into the retracted position, the arm 5 extends substantially horizontally forwards from the pivot 7 and the arm 6 extends substantially vertically downwards (FIG. 2).

Figure 4:
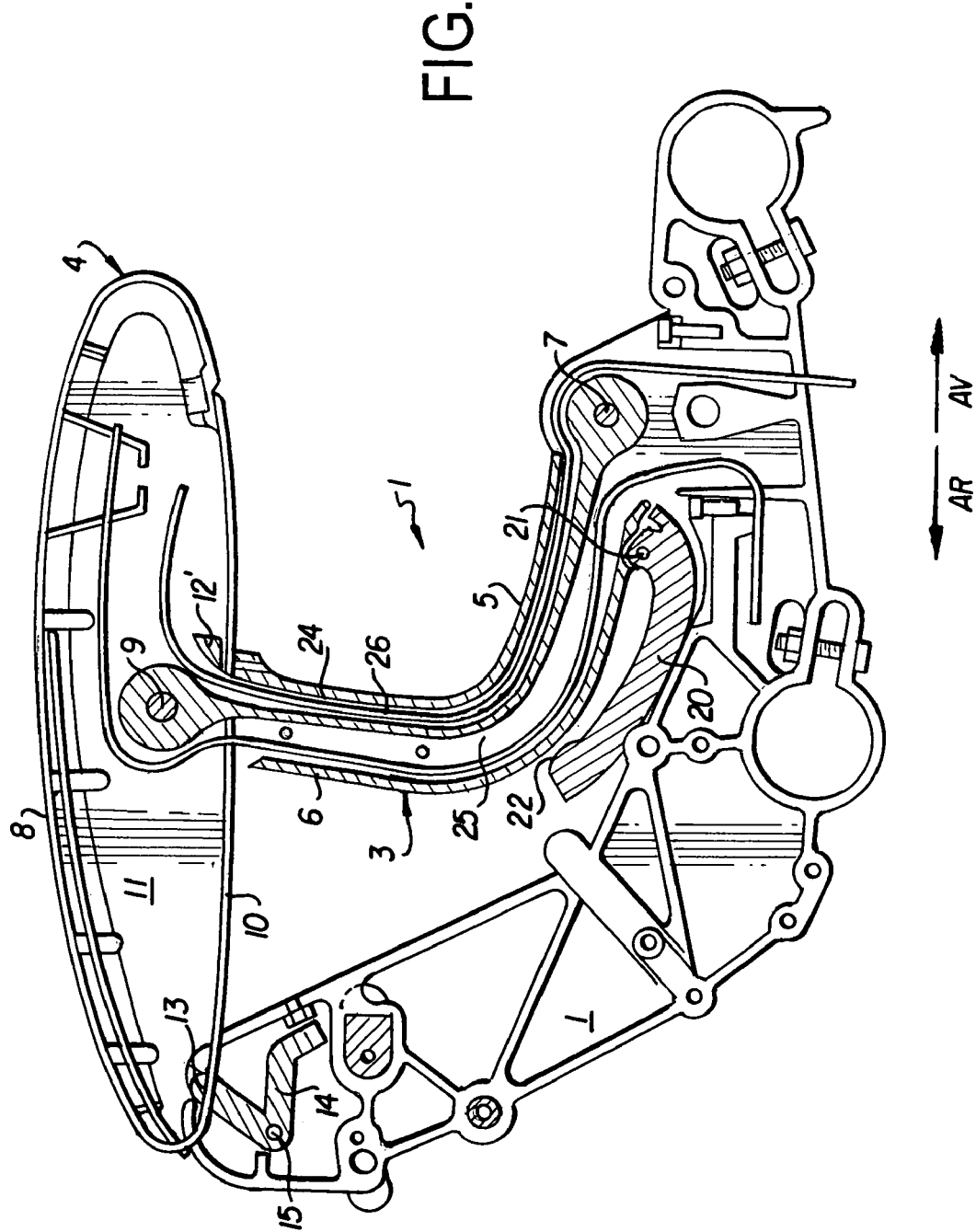
FIG. 4 is a side section view of the armrest as locked in the in-use 25 position, showing the armrest from the opposite side of FIG. 1.

The rest element 4 is provided with padding 8 and is hinged to the free end 20 of the arm 6 about a second transverse axis or pivot 9 (FIG. 4). The rest element 4 is made up of two side cheek plates 10 defining a recess 11 between them in the rear of the element (FIG. 4).

Figure 5:
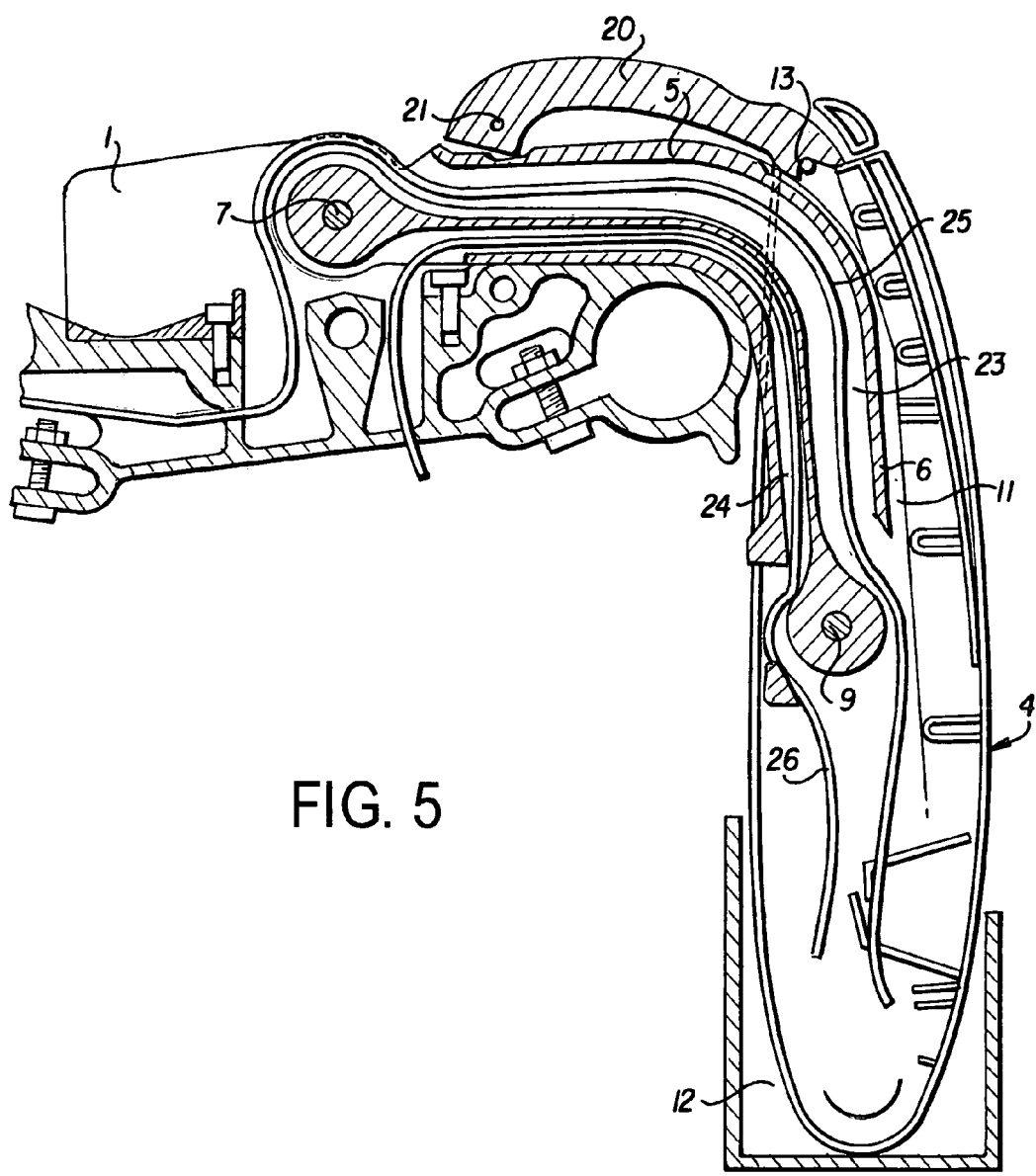
FIG. 5 is a longitudinal section view of the armrest as locked in the retracted position, showing the armrest from the opposite side of FIG. 2.

When the armrest is in the in-use position, the rest element 4 is substantially horizontal and perpendicular to the arm 6 of the strut 3. When the rest element 4 is in the retracted position, it is substantially vertical and in front of the structure element 1, and the arm 6 is received in the recess 11 (FIG. 5). In this position, the front portion of the rest element 4 is engaged in a recess 12 integral with the support structure (FIG. 5).

An abutment 12' (FIG. 4) is mounted on the rest element 4 so as to prevent the rest element 4 from having a degree of freedom through which it can pivot relative to the strut 3 about the pivot 9 when the armrest 2 is in the in-use position. The entire armrest 2 is then prevented from having a degree of freedom through which it can pivot about the pivot 7 by means described below. The abutment 12' can be adjustable, so that it is possible to adjust the height of the rest element 4 when the element is in use.

Figure 6:
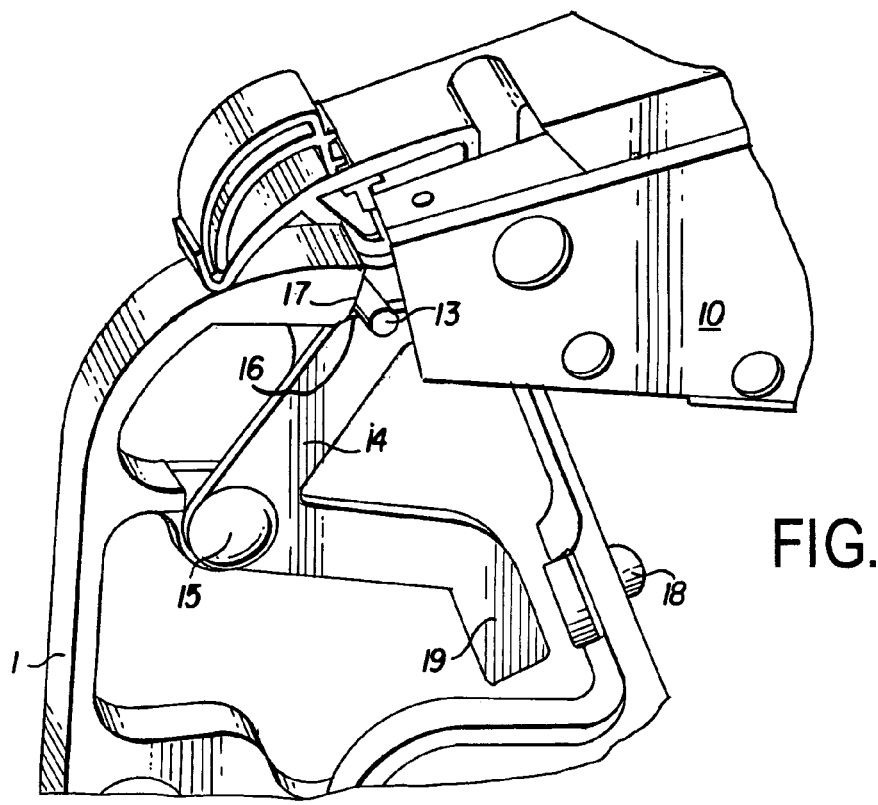
FIG. 6 is an enlarged partial perspective view of the locking means for locking the armrest in the in-use position.

A description follows of a first locking means for locking the armrest in the in-use position with respect to the support element 1. As seen in FIGS. 4 and 6, between its two cheek plates 10, and behind the recess 11, the rest element 4 is provided with a transverse finger 13. A first locking lever 14 is mounted on the structure element 1 and hinged about a third transverse axis or pivot 15. At its end, the lever 14 is provided with a hook-shaped notch 16 suitable for engaging the finger 13. FIG. 6 shows that the armrest is locked in the in-use position when the finger 13 is engaged in the notch 16 and is secured between the notch 16 and a portion 17 of the structure element 1. Resilient means (not shown) can be used to hold the lever 14 in the position shown in FIG. 6.

An unlocking button 18 is slideably mounted to the structure element 1 facing a projection 19 on the lever 14 (FIG. 6). The in-use position of the armrest 2 is unlocked by pressing on the button 18 against projection 19 so as to cause the lever 14 to pivot against the drive or bias of the resilient means to release the finger 13.

Figure 3:
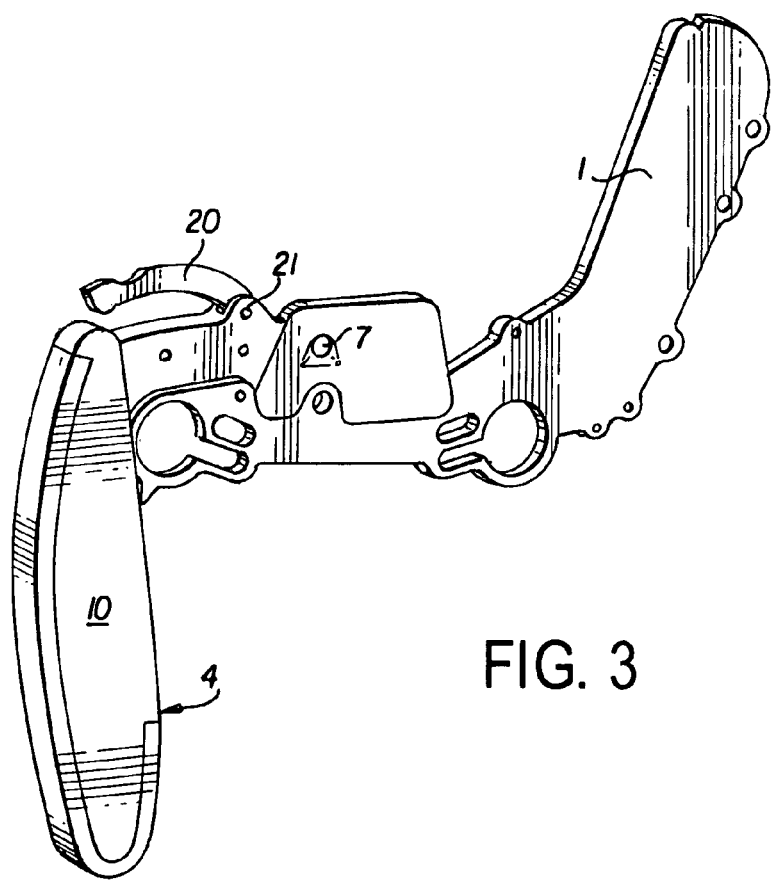
FIG. 3 is a view similar to the FIG. 2 view, with the armrest unlocked in the retracted position.
Figure 7:
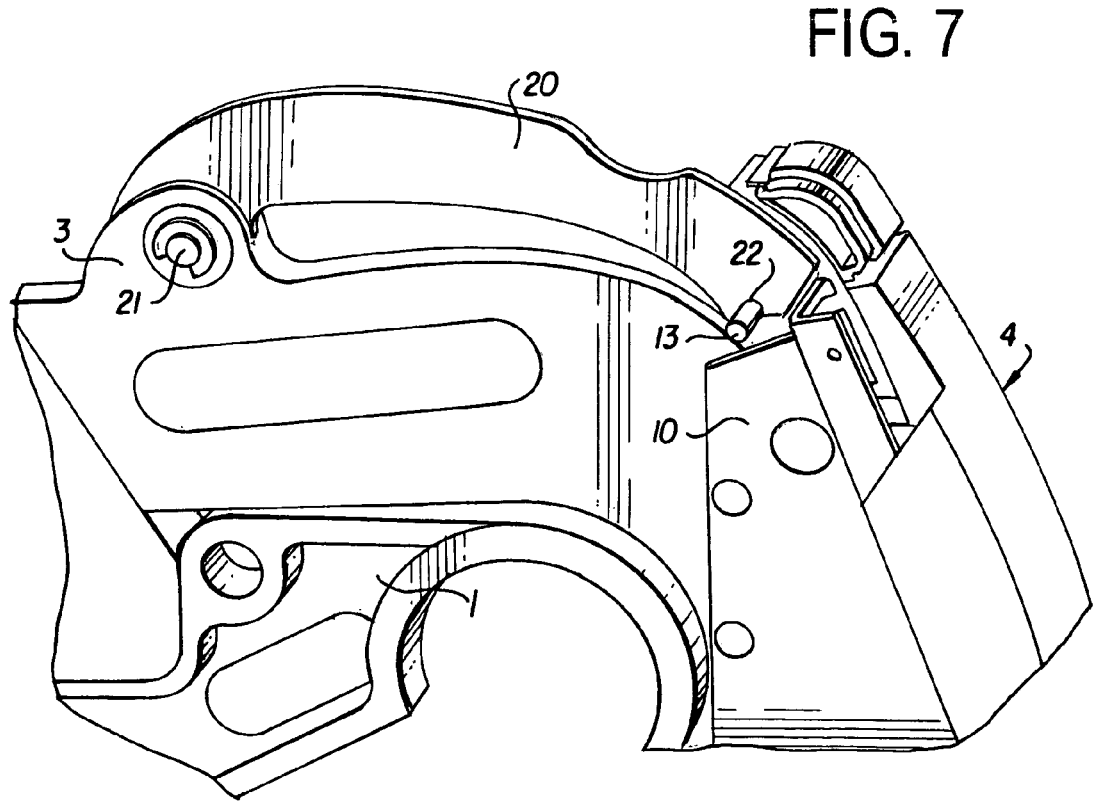
FIG. 7 is a view similar to the FIG. 6 view, showing the locking means for locking the armrest in the retracted position.

A description follows of a second locking means for locking the armrest 2 in the retracted position. FIGS. 4 and 7 show that a second lever 20 is hinged to the arm 5 of the strut 3 about a fourth transverse axis or pivot 21. The lever 20 is substantially horizontal both when the armrest is in the in-use position (FIG. 4), and when it is in the retracted position (FIG. 7). When the armrest is in the retracted position, the lever 20 extends forwards relative to the pivot 21 (FIG. 3).

At its free end, the lever 20 is provided with a setback or recess 22 (FIG. 7) into which the finger 13 comes into abutment when the armrest is pivoted to the retracted position. Resilient means (not shown) can be used to urge or bias the lever 20 into abutment with the finger 13. When the armrest is in the retracted position, the front end of the rest element 4 is engaged in the recess 12, and the armrest cannot pivot about the pivot 7, thereby locking the armrest in the retracted position.

Unlocking the armrest from the retracted position requires pressing on the lever 20 against the drive or bias from the resilient means so as to release the finger 13 and disengage the lever 20 from the rest element 4.

Finally, it should be observed that it is optionally possible to omit the lever 20 and then provide merely the recess 12 so as to limit the movement of the armrest when it is in the retracted position.

In FIGS. 4 and 5, it can also be seen that passageways 23 and 24 are provided in the strut 3. The passageway 23 receives electrical control cables 25 and the passageway 24 receives a mechanical control cable 26.

The invention claimed is:

1. A seat for a transport vehicle or craft, the seat including a support structure and at least one armrest comprising a rest element mounted on one end of a strut whose other end is hinged to the support structure about a first pivot to tilt the armrest between an in-use position in which the rest element is substantially horizontal and a forwardly-tilted retracted position in which the rest element is substantially vertical and in front of the seat, wherein said strut is L-shaped with first and second arms forming a unitary one-piece member, said first arm being hinged at its free end remote from said second arm about said first pivot and extending substantially rearwards from said first pivot when said strut is in the in-use position, and substantially forwards from said first pivot when said strut is in the retracted position and said second arm extending substantially upwards when the strut is in the in-use position, and substantially downwards when the strut is in the retracted position, and that said rest element is hinged to the free end of said second arm of the strut about a second pivot.

2. A seat according to claim 1, in which said rest element is provided with a recess for receiving said second arm when said strut is in the retracted position.

3. A seat according to claim 1, provided with first locking means for locking the armrest in the in-use position.

4. A seat according to claim 3, in which said first locking means comprise a transverse finger mounted at the rear part of the rest element for cooperating with a locking lever hinged on said support structure.

5. A seat according to claim 4, wherein said transverse finger engages a hook-shaped notch of said locking lever.

6. A seat according to claim 5, provided with an unlocking button slideably mounted to move on said support structure for moving said locking lever.

7. A seat according to claim 3, including second locking means for locking the armrest in the retracted position.

8. A seat according to claim 7, in which said second locking means comprise a lever hinged to said strut that engages a transverse finger mounted on a rear end of said rest element, and a recess mounted on said support structure for receiving a front end of said rest element for preventing the armrest as locked in this way from pivoting about said first pivot.

9. A seat according to claim 1, in which said strut is provided with passageways for at least one cable which may be an electrical cable or a mechanical control cable.

10. A seat according to claim 1, in which an abutment on said rest element is provided for preventing said rest element from pivoting about said second pivot in the direction in which the armrest is pivoted into the in-use position.

11. A seat for a transport vehicle or craft, the seat including a support structure and at least one armrest comprising a rest element mounted on one end of a strut whose other end is hinged to the support structure about a first pivot to tilt the armrest between an in-use position in which the rest element is substantially horizontal and a forwardly-tilted retracted position in which the rest element is substantially vertical and in front of the seat, wherein said strut is L-shaped with a first arm hinged at its free end about said first pivot and extending substantially rearwards from said first pivot when said strut is in its in-use position, and substantially forwards from said first pivot when said strut is in its retracted position and a second arm extending substantially upwards when the strut is in its in-use position, and substantially downwards when the strut is in its retracted position, and that said rest element is hinged to the free end of said second arm of the strut about a second pivot, the seat being provided with first locking means for locking the armrest in the in-use position, said first locking means comprising a transverse finger mounted on a rear end of said rest element engaging a hook-shaped end of a first lever hinged to said support structure about a third pivot, the seat including second locking means for locking the armrest in the retracted position, said second locking means comprising a second lever hinged to said first arm of said strut about a fourth pivot and provided at its free end with a setback that engages said transverse finger.

12. A seat for a transport vehicle or craft, the seat including a support structure and at least one armrest comprising a rest element mounted on one end of a strut whose other end is hinged to the support structure about a first pivot to tilt the armrest between an in-use position in which the rest element is substantially horizontal and a forwardly-tilted retracted position in which the rest element is substantially vertical and in front of the seat, wherein said strut is L-shaped with a first arm hinged at its free end about said first pivot and extending substantially rearwards from said first pivot when said strut is in the in-use position, and substantially forwards from said first pivot when said strut is in the retracted position and a second arm extending substantially upwards when the strut is in the in-use position, and substantially downwards when the strut is in the retracted position, and that said rest element is hinged to the free end of said second arm of the strut about a second pivot, and the seat being provided with first and second locking means for locking the armrest in the in-use and retracted positions, respectively.

13. A seat according to claim 12, in which said second locking means comprise a lever hinged to said strut that engages a transverse finger mounted on a rear end of said rest element, and a recess mounted on said support structure for receiving a front end of said rest element for preventing the armrest as locked in this way from pivoting about said first pivot.

* * * * *